United States Patent
Fu et al.

(10) Patent No.: US 11,358,898 B2
(45) Date of Patent: Jun. 14, 2022

(54) METHODS TO IMPROVE ION EXCHANGE EFFICIENCY OF GLASSES AND GLASS CERAMICS

(71) Applicant: CORNING INCORPORATED, Corning, NY (US)

(72) Inventors: Qiang Fu, Painted Post, NY (US); Kristy Lynn Smith, Bath, NY (US)

(73) Assignee: CORNING INCORPORATED, Corning, NY (US)

( * ) Notice: Subject to any disclaimer, the term of this patent is extended or adjusted under 35 U.S.C. 154(b) by 144 days.

(21) Appl. No.: 16/155,302

(22) Filed: Oct. 9, 2018

(65) Prior Publication Data

US 2019/0119153 A1    Apr. 25, 2019

Related U.S. Application Data

(60) Provisional application No. 62/574,994, filed on Oct. 20, 2017.

(51) Int. Cl.
*C03C 21/00* (2006.01)

(52) U.S. Cl.
CPC .......... *C03C 21/002* (2013.01); *C03C 21/005* (2013.01)

(58) Field of Classification Search
None
See application file for complete search history.

(56) References Cited

U.S. PATENT DOCUMENTS

| | | | |
|---|---|---|---|
| 3,218,220 A | 11/1965 | Weber | |
| 3,498,733 A | 3/1970 | Grubb | |
| 4,671,814 A * | 6/1987 | Aratani | C03C 21/00 428/410 |
| 4,710,430 A | 12/1987 | Borrelli et al. | |
| 5,674,790 A | 10/1997 | Araujo | |
| 2012/0210749 A1* | 8/2012 | Feng | C03C 17/007 65/30.14 |
| 2014/0112983 A1* | 4/2014 | Giordano | A61K 36/88 424/457 |
| 2014/0345325 A1* | 11/2014 | Allan | C03C 21/002 65/30.14 |
| 2016/0102010 A1* | 4/2016 | Beall | C03C 4/02 428/410 |

(Continued)

FOREIGN PATENT DOCUMENTS

| CH | 475171 A4 | 5/1975 |
|---|---|---|
| CN | 104788013 A * | 7/2015 |

(Continued)

OTHER PUBLICATIONS

Bauer et al., "High-Temperature Molten Salts for Solar Power Application", Molten Salts Chemistry from Lab to Applications, Elsevier, 2013, pp. 415-438. (Year: 2013).*

(Continued)

*Primary Examiner* — Lisa L Herring

(74) *Attorney, Agent, or Firm* — Kevin M. Johnson

(57) ABSTRACT

The efficiency of ion exchange processes is increased by increasing the concentration of nitrite salts in the molten salt bath. The increase in nitrite salt concentration may be achieved by adding a nitrite salt to a molten nitrate salt bath, aging a molten nitrate salt bath, or a combination thereof. The glass-based articles produced using the modified baths exhibit reduced haze and increased flexural strength.

14 Claims, 7 Drawing Sheets

(56) References Cited

U.S. PATENT DOCUMENTS

| | | | |
|---|---|---|---|
| 2016/0225396 A1 | 8/2016 | Shimojima | |
| 2020/0031682 A1* | 1/2020 | Paulsen | C01D 1/20 |
| 2020/0055773 A1* | 2/2020 | Fujiwara | C03C 3/097 |

FOREIGN PATENT DOCUMENTS

| | | |
|---|---|---|
| CN | 105518779 A | 4/2016 |
| GB | 1332996 A | 10/1973 |
| WO | WO-2018199045 A1 * 11/2018 | C03C 21/002 |

OTHER PUBLICATIONS

CN 104788013A—EPO Machine Translation Performed Aug. 10, 2021. (Year: 2021).*

English Translation of CN104788013A—Performed Sep. 13, 2021—USPTO Translation Service Center. (Year: 2021).*

International Search Report and Written Opinion PCT/US2018/056234 dated Jan. 9, 2019, 12 pgs.

Dukel'skii and Evstrop'ev, "Forming nanosize MgO coatings on a glass surface," Journal of Optical Material Science and Technology 77(1), Jan. 2010: pp. 45-49.

Fu and Mauro, "Mutual Diffusivity, Network Dilation, and Salt Bath Poisoning Effects in Ion-Exchanged Glass," Journal of Non-Crystalline Solids 363, 2013: pp. 199-204.

Gy, "Ion exchange for glass strengthening," Materials Science and Engineering B 149, 2008: pp. 159-165.

Jacoby, "New Applications for Glass Emerge," Chern. Eng. News, 90(25) Jun. 2012: pp. 34-36. Downloaded from: https://cen.acs.org/articles/90/i25/New-Applications-Glass-Emerge.html.

Sglavo, "Chemical strengthening of soda lime silicate float glass: effect of small differences in the KNO3 bath," International Journal of Applied Glass Science 6(1), 2015: pp. 72-82.

Chinese Patent Application No. 201880068323.0, Office Action dated Feb. 25, 2022, 12 pages of English Translation, Chinese Patent Office.

* cited by examiner

METHODS TO IMPROVE ION EXCHANGE EFFICIENCY OF GLASSES AND GLASS CERAMICS

CROSS-REFERENCE TO RELATED APPLICATIONS

This application claims the benefit of priority of U.S. Provisional Application Ser. No. 62/574,994 filed on Oct. 20, 2017, the contents of which are relied upon and incorporated herein by reference in their entirety.

FIELD

This disclosure relates to methods of ion exchanging glass-based substrates to produce ion exchanged glass-based articles, and the glass-based.

SUMMARY

In aspect (1), a method is provided. The method comprises: immersing a glass-based substrate in a molten salt bath to produce a glass-based article, wherein prior to the immersion of any glass-based substrate in the molten salt bath, the molten salt bath comprises: a nitrate salt, and a nitrite salt in an amount of about 0.01 wt % or more.

In aspect (2), the method of aspect (1) is provided, wherein the nitrite salt comprises at least one of $NaNO_2$, $LiNO_2$, $KNO_2$, $RbNO_2$, and $AgNO_2$.

In aspect (3), the method of aspect (1) is provided, wherein the nitrite salt comprises at least one of $NaNO_2$ or $KNO_2$.

In aspect (4), the method of any of aspects (1) to (3) is provided, wherein the nitrate salt comprises at least one of $NaNO_3$, $LiNO_3$, $KNO_3$, $RbNO_3$, and $AgNO_3$.

In aspect (5), the method of any of aspects (1) to (4) is provided, wherein the nitrate salt comprises $NaNO_3$.

In aspect (6), the method of any of aspects (1) to (5) is provided, further comprising adding the nitrite salt to the molten salt bath prior to immersing the glass-based substrate.

In aspect (7), the method of any of aspects (1) to (6) is provided, further comprising aging the molten salt bath at a temperature of about 300° C. or greater for a time of about 6 hours or more before immersing the glass-based substrate.

In aspect (8), the method of any of aspects (1) to (7) is provided, wherein the molten salt bath contains the nitrite salt in an amount of about 0.1 wt % or more.

In aspect (9), the method of any of aspects (1) to (8) is provided, wherein the molten salt bath contains the nitrite salt in an amount of 1.0 wt % or less.

In aspect (10), the method of any of aspects (1) to (9) is provided, wherein at least about 99% of a surface of the glass-based article is free of haze.

In aspect (11), the method of any of aspects (1) to (10) is provided, wherein at least about 99% of a surface of the glass-based article is substantially free of magnesium and calcium containing deposits.

In aspect (12), the method of any of aspects (1) to (11) is provided, wherein the glass-based substrate comprises a glass ceramic.

In aspect (13), the method of aspect (12) is provided, wherein the glass ceramic comprises a petalite crystalline phase.

In aspect (14), the method of any of aspects (1) to (13) is provided, wherein the glass-based substrate comprises at least one of $Li_2O$, $Na_2O$, $K_2O$, and $Rb_2O$.

In aspect (15), the method of any of aspects (1) to (14) is provided, wherein the glass-based substrate comprises a soda lime silicate glass.

In aspect (16), the method of any of aspects (1) to (15) is provided, wherein the glass-based article has a flexural strength of about 500 MPa or more.

In aspect (17), a glass-based article produced according to any of aspects (1) to (16) is provided.

In aspect (18), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least a portion of at least one of the housing or the cover glass comprises the glass-based article of aspect (17).

In aspect (19), a method is provided. The method comprises: aging a molten nitrate salt bath at a temperature of about 300° C. or greater for a time of about 6 hours or more to form an aged molten nitrate salt bath; and immersing a glass-based substrate in the aged molten nitrate salt bath to produce a glass-based article, wherein the aging occurs prior to the immersion of any glass-based substrate in the molten salt bath.

In aspect (20), the method of aspect (19) is provided, wherein the molten nitrate salt bath comprises at least one of $NaNO_3$, $LiNO_3$, $KNO_3$, $RbNO_3$, and $AgNO_3$.

In aspect (21), the method of aspect (19) is provided, wherein the molten nitrate salt bath comprises $NaNO_3$.

In aspect (22), the method of any of aspects (19) to (21) is provided, wherein the aging is at a temperature of about 600° C. or less.

In aspect (23), the method of any of aspects (19) to (22) is provided, wherein the aging is at a temperature of about 390° C. to about 480° C.

In aspect (24), the method of any of aspects (19) to (23) is provided, wherein the aging is for a time of about 240 hours or less.

In aspect (25), the method of any of aspects (19) to (24) is provided, wherein the aged molten nitrate salt bath comprises a higher concentration of a nitrite salt than the molten nitrate salt bath.

In aspect (26), the method of any of aspects (19) to (25) is provided, wherein at least about 99% of a surface of the glass-based article is free of haze.

In aspect (27), the method of any of aspects (19) to (26) is provided, wherein at least about 99% of a surface of the glass-based article is substantially free of magnesium and calcium containing deposits.

In aspect (28), the method of any of aspects (19) to (27) is provided, wherein the glass-based substrate comprises a glass ceramic.

In aspect (29), the method of aspect (28) is provided, wherein the glass ceramic comprises a petalite crystalline phase.

In aspect (30), the method of any of aspects (19) to (29) is provided, wherein the glass-based substrate comprises at least one of $Li_2O$, $Na_2O$, $K_2O$, and $Rb_2O$.

In aspect (31), the method of any of aspects (19) to (30) is provided, wherein the glass-based substrate comprises a soda lime silicate glass.

In aspect (32), the method of any of aspects (19) to (31) is provided, wherein the glass-based article has a flexural strength of about 500 MPa or more.

In aspect (33), a glass-based article produced according to any of aspects (19) to (32) is provided.

In aspect (34), a consumer electronic product is provided. The consumer electronic product comprises: a housing having a front surface, a back surface and side surfaces; electrical components provided at least partially within the housing, the electrical components including at least a controller, a memory, and a display, the display being provided at or adjacent the front surface of the housing; and a cover glass disposed over the display, wherein at least a portion of at least one of the housing or the cover glass comprises the glass-based article of aspect (33).

These and other aspects, advantages, and salient features will become apparent from the following detailed description, the accompanying drawings, and the appended claims.

DETAILED DESCRIPTION

Figure 1A:
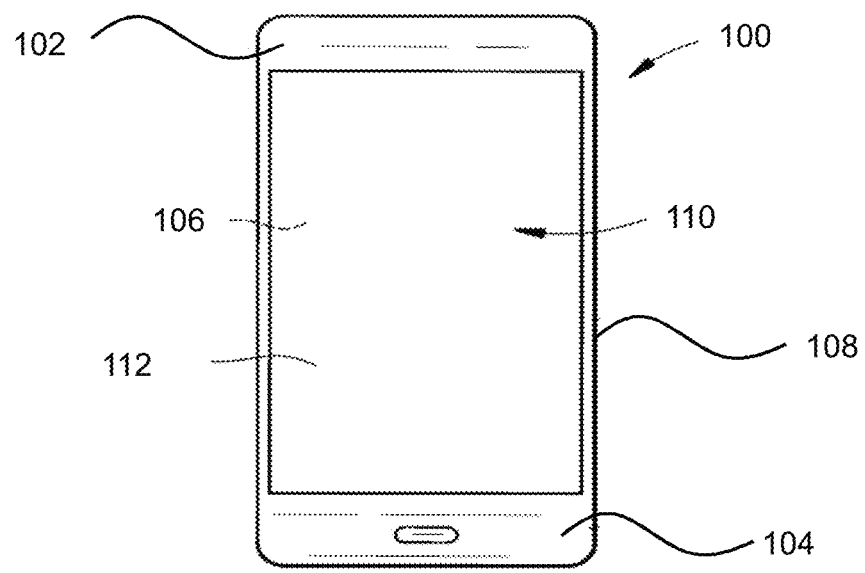
FIG. 1A is a plan view of an exemplary electronic device incorporating any of the glass-based articles disclosed herein.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the term "glass-based" is used in its broadest sense to include any objects made wholly or partly of glass, including glass ceramics (which include a crystalline phase and a residual amorphous glass phase). Unless otherwise specified, all compositions of the glasses described herein are expressed in terms of mole percent (mol %), and the constituents are provided on an oxide basis. Unless otherwise specified, all temperatures are expressed in terms of degrees Celsius (° C.).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. For example, a glass that is "substantially free of $K_2O$" is one in which $K_2O$ is not actively added or batched into the glass, but may be present in very small amounts as a contaminant, such as in amounts of less than about 0.01 mol %.

Reference will now be made in detail to various embodiments, examples of which are illustrated in the accompanying examples and drawings.

Strengthened glass-based articles may be produced by chemical strengthening. The strengthened glass-based articles exhibit improved mechanical strength and reliability. In one method of chemical strengthening, glass-based substrates are ion exchanged to produce a strengthened glass-based article. As used herein, a "glass-based article" refers to an ion exchanged glass-based article, and a "glass-based substrate" refers to the glass-based precursor that is chemically strengthened to form the glass-based article.

The ion exchange process may include immersing a glass-based substrate in a molten alkali salt bath to exchange the alkali ions from the salt bath for alkali ions that are present in the glass-based substrate. The molten alkali salt bath may be maintained at a temperature below the glass transition temperature of the glass-based substrate. Where the ions exchanged from the molten salt bath into the glass-based substrate have a larger ionic radius than the ions that they replace in the glass-based substrate, a glass-based article is produced that includes a compressive stress layer at the surface. This compressive stress layer strengthens the glass-based article, and reduces the likelihood of breakage from the introduction of surface flaws to the glass-based article. These strengthened glass-based articles are commonly employed in applications where scratch-resistance, abrasion resistance, and fracture resistance are desired.

The molten salt bath composition employed in ion exchanged processes affects the efficiency and effectiveness of the ion exchange, and thereby impacts the properties of the glass-based articles produced by ion exchange. Impurities in the molten salt bath may be detrimental to the ion exchange process. In some circumstances, impurities may form an inorganic layer on the surface of the glass-based substrate that inhibits the ion exchange, thereby reducing the mechanical strength of the resulting glass-based article. This "blocking" inorganic layer issue is particularly prevalent for glass-based substrates that include soda lime silicates. It has also been observed that an inorganic layer may be formed on the surface of glass-based substrates that contain lithium and/or sodium. The inorganic layer may contribute to a hazy appearance of the glass-based article, which is undesirable. Impurities that may be present in the molten salt bath and contribute to the formation of the inorganic layer include magnesium and calcium. To avoid the formation of an inorganic layer, a high purity molten salt bath may be utilized that includes impurities at a level below a part per million. However, high purity molten salt baths impart an added cost that is undesirable.

The methods described herein address the formation of an inorganic layer on glass-based articles due to the presence of impurities in a molten salt bath, without requiring the use of a high purity molten salt bath. Additionally, the methods described herein allow the production of a glass-based article that is substantially free or free of haze without requiring post-ion exchange polishing or removal of an inorganic layer.

The methods described herein prevent or minimize the formation of an inorganic layer on glass-based articles by increasing the presence of a nitrite salt in molten nitrate salt baths. The increase in nitrite salt concentration may be achieved by two separate mechanisms. In a first approach, a fresh molten nitrate salt bath may be aged at elevated temperatures to produce nitrite salt in the bath. In a second approach, a nitrite salt may be added to a fresh molten nitrate salt bath. Additionally, these two approaches may be combined, such that a nitrite salt is added to the molten nitrate salt bath and the molten nitrate salt bath is aged at an elevated temperature. As utilized herein, a "fresh molten nitrate salt bath" is a bath in which no glass-based substrates have been submersed for the purposes of ion exchange.

Without wishing to be bound by any theory, the increased nitrite salt concentration in the molten nitrate salt bath may prevent the deposition of impurities in the molten salt bath as oxides in an inorganic layer on the surface of the glass-based article. The deposition occurs when oxide species of the impurities are present in the molten salt bath. The impurities are often originally present in the molten salt bath as nitrate salts. These nitrate salts may then decompose to form an oxide of the impurity as well as the gasous components nitrogen dioxide and oxygen. The decomposition reaction proceeds at elevated temperatures, such as above about 300° C. for $Mg(NO_3)_2$, producing impurity oxide constituents in the molten salt bath. The decomposition reaction is demonstrated by the following equation, where magnesium is utilized as a representative impurity:

$$2Mg(NO_3)_2 \rightarrow 2MgO+4NO_2+O_2$$

Accordingly, an increase in the nitrite concentration in the molten salt bath inhibits the decomposition reaction (shifts quilibrium towards the left in the above equation), preventing the formation of oxides in the molten salt bath. The impurity oxides present in the bath have been shown to attach to the surface of the glass-based article during the ion exchange process. The resulting deposits may produce haze and an inorganic layer of the type described above which reduces the mechanical strength of the glass-based articles. Thus, reducing the impurity oxides present in the molten salt bath reduces the incidence of haze and produces glass-based articles with increased strength.

In some embodiments, a method of increasing the nitrite ($—NO_2$) salt content of a molten nitrate ($—NO_3$) salt bath includes aging a fresh molten nitrate salt bath at an elevated temperature. As utilized herein, "aging" refers to maintaining the molten nitrate salt bath at an elevated temperature for a specified period of time. The aging of the molten nitrate salt bath allows the decomposition of the nitrate salt to form a nitrite salt and gaseous oxygen. The nitrate salt decomposition reaction is demonstrated by the following equation, where sodium is utilized as a representative nitrate salt:

$$2NaNO_3 \rightarrow 2NaNO_2+O_2$$

Thus, aging a fresh molten nitrate salt bath at an elevated temperature will result in an increase in the nitrite salt concentration in the bath. Additionally, aging the molten nitrate salt bath will result in the formation of molten nitrate salt bath containing a nitrite salt even when no nitrite salt is added to the molten nitrate salt bath.

The aging of the molten nitrate salt bath may continue for any time period and at any temperature sufficient to produce the desired nitrite salt bath concentration. In some embodiments, the aging of the molten nitrate salt bath may occur at a temperature of at least about 300° C., such as a temperature of about 300° C. to about 600° C., about 310° C. to about 580° C., about 320° C. to about 570° C., about 330° C. to about 550° C., about 340° C. to about 530° C., about 350° C. to about 520° C., about 360° C. to about 510° C., about 370° C. to about 500° C., about 380° C. to about 490° C., about 390° C. to about 480° C., or any sub-ranges contained within these endpoints. In some embodiments, the aging of the molten nitrate salt bath may occur at a temperature of at least about 300° C., such as a temperature of at least about 310° C., at least about 320° C., at least about 330° C., at least about 340° C., at least about 350° C., at least about 360° C., at least about 370° C., at least about 380° C., at least about 390° C., at least about 400° C., at least about 410° C., at least about 420° C., at least about 430° C., at least about 440° C., at least about 450° C., at least about 460° C., at least about 470° C., or more. In some embodiments, the aging of the molten nitrate salt bath may occur at a temperature of less than about 600° C., such as a temperature of less than about 580° C., less than about 570° C., less than about 550° C., less than about 530° C., less than about 520° C., less than about 510° C., less than about 500° C., less than about 490° C., less than about 480° C., or less. In some embodiments, the aging temperature may be the same as the temperature of the bath during ion exchange. In some other embodiments, the aging temperature may be above or below the temperature of the bath during ion exchange. In some embodiments, the aging of the molten nitrate salt bath may extend for at least about 6 hours, such as about 6 hours to about 240 hours, about 7 hours to about 220 hours, about 8 hours to about 200 hours, about 9 hours to about 180 hours, about 10 hours to about 160 hours, about 11 hours to about 140 hours, about 12 hours to about 120 hours, about 13 hours to about 100 hours, about 14 hours to about 90 hours, about 15 hours to about 80 hours, about 16 hours to about 70 hours, about 17 hours to about 60 hours, about 18 hours to about 50 hours, about 19 hours to about 40 hours, about 20 hours to about 30 hours, or any sub-ranges contained with these endpoints.

The desired nitrite salt content of the molten nitrate salt bath after aging is any amount sufficient to reduce and/or eliminate the formation of impurity oxides in the bath. In some embodiments, the aged molten nitrate salt bath may include a nitirite salt in an amount of at least about 0.01 wt %, such as about 0.01 wt % to about 10 wt %, about 0.1 wt % to about 9 wt %, about 0.2 wt % to about 8 wt %, about 0.3 wt % to about 7 wt %, about 0.4 wt % to about 6 wt %, about 0.5 wt % to about 5 wt %, about 0.6 wt % to about 4 wt %, about 0.7 wt % to about 3 wt %, about 0.8 wt % to about 2 wt %, about 0.9 wt % to about 1 wt %, or any sub-ranges contained within these endpoints. Further, the aged molten nitrate salt bath contains a higher nitrite salt concentration than the molten nitrate salt bath prior to the aging.

In some embodiments, a method of increasing the nitrite ($—NO_2$) salt content of a molten nitrate ($—NO_3$) salt bath includes adding a nitrite salt directly to the bath. The nitrite salt may be added to the bath in any amount sufficient to reduce and/or eliminate the formation of impurity oxides in the bath. In some embodiments, the molten nitrate salt bath may include a nitrite salt in an amount of at least about 0.01 wt %, such as about 0.01 wt % to about 10 wt %, about 0.1 wt % to about 9 wt %, about 0.2 wt % to about 8 wt %, about 0.3 wt % to about 7 wt %, about 0.4 wt % to about 6 wt %, about 0.5 wt % to about 5 wt %, about 0.6 wt % to about 4 wt %, about 0.7 wt % to about 3 wt %, about 0.8 wt % to about 2 wt %, about 0.9 wt % to about 1 wt %, about 0.01 wt % to about 1 wt %, or any sub-ranges contained within these endpoints. In some embodiments, the nitrite salt is added to the bath in an amount of about 0.5 wt %.

In some embodiments, the nitrite salt added to the molten nitrate salt bath may be a salt of the same component as the nitrate salt. For example, sodium nitrite may be added to a molten salt bath containing sodium nitrate. In some embodiments, the nitrite salt added to the molten nitrate salt bath may be a salt of the same component as the predominant nitrate salt contained in the bath. For example, a potassium nitrite may be added to a molten salt bath that includes a mixture of potassium nitrate and sodium nitrate, with potassium nitrate being present in a greater concentration. In some embodiments, multiple nitrite salts may be added to the molten nitrate salt bath. In some embodiments, the nitrite salt added to the molten nitrate salt bath may be at least one of sodium nitrite and lithium nitrite. In some embodiments, the nitrite salt may be one or more of $NaNO_2$, $LiNO_2$, $KNO_2$, $RbNO_2$, and $AgNO_2$.

The aging and nitrite salt addition approaches may be employed in combination. In some embodiments, a nitrite salt may be added to a molten nitrate salt bath before or after the molten nitrate salt bath is aged at an elevated temperature. In such embodiments, it is possible to carry out the aging of the molten nitrate salt bath for shorter time periods than in cases where aging alone is utilized to increase the nitrite salt concentration in the molten nitrate salt bath.

The molten nitrate salt bath used as a starting point for any of the above nitrite concentration increase methods may be any molten nitrate salt bath suitable for ion exchange. In some embodiments, the molten nitrate salt bath may include at least one of $NaNO_3$, $LiNO_3$, $KNO_3$, $RbNO_3$, and $AgNO_3$. In some embodiments, the molten nitrate salt bath may include a mixture of nitrates, such as sodium nitrate and potassium nitrate. The composition of the molten nitrate salt bath may be selected based on the composition of the glass-based substrate and the desired stress profile characteristics.

The nitrite salt containing molten nitrate salt baths produced by any of the above described methods may be employed to produce a strengthened glass-based article. The glass-based articles are produced by immersing a glass-based substrate in the nitrite salt containing molten salt bath. The resulting glass-based articles have a compressive stress layer extending from the surface of the glass-based article to a depth of compression.

The glass-based articles may have a flexural strength of at least about 500 MPa, such as at least about 550 MPa, at least about 600 MPa, at least about 650 MPa, at least about 700 MPa, at least about 750 MPa, at least about 800 MPa, at least about 850 MPa, at least about 900 MPa, or more.

The glass-based articles may be substantially free or free of haze. In some embodiments, the glass-based articles may have a surface that is at least 99% free of haze. Stated differently, at least 99% of the surface area of the glass-based articles may exhibit no haze. In some embodiments, the glass-based articles are free of haze.

The glass-based articles may be substantially free or free of deposits of magnesium and calcium. In some embodiments, the glass-based articles may have a surface that is at least 99% free of deposits of magnesium and calcium. Stated differently, at least 99% of the surface area of the glass-based articles may exhibit no deposits of magnesium and calcium. In some embodiments, the glass-based articles are free of deposits of magnesium and calcium.

The glass-based substrates utilized to form the glass-based articles described herein may be any appropriate material. In some embodiments, the glass-based substrates are a glass, such as a soda lime silicate glass, lithium silicate glass, or a sodium silicate glass. In some embodiments, the glass-based substrate may be a glass ceramic, such as a petalite crystalline phase containing glass ceramic. In some embodiments, the glass-based substrate includes at least one of $Li_2O$, $Na_2O$, $K_2O$, and $Rb_2O$.

Figure 1B:
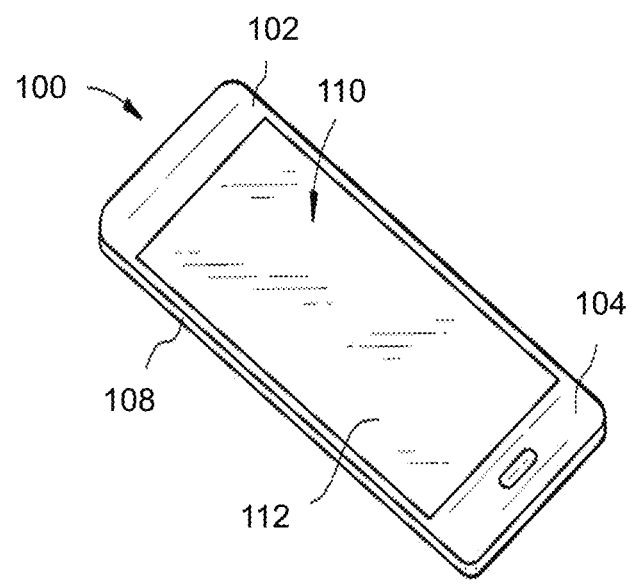
FIG. 1B is a perspective view of the exemplary electronic device of FIG. 1A.

The strengthened glass-based articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the strengthened articles disclosed herein is shown in FIGS. 1A and 1B. Specifically, FIGS. 1A and 1B show a consumer electronic device 100 including a housing 102 having front 104, back 106, and side surfaces 108; electrical components (not shown) that are at least partially inside or entirely within the housing and including at least a controller, a memory, and a display 110 at or adjacent to the front surface of the housing; and a cover substrate 112 at or over the front surface of the housing such that it is over the display. In some embodiments, at least one of the cover substrate 112 or a portion of housing 102 may include any of the strengthened articles disclosed herein.

Figure 2:
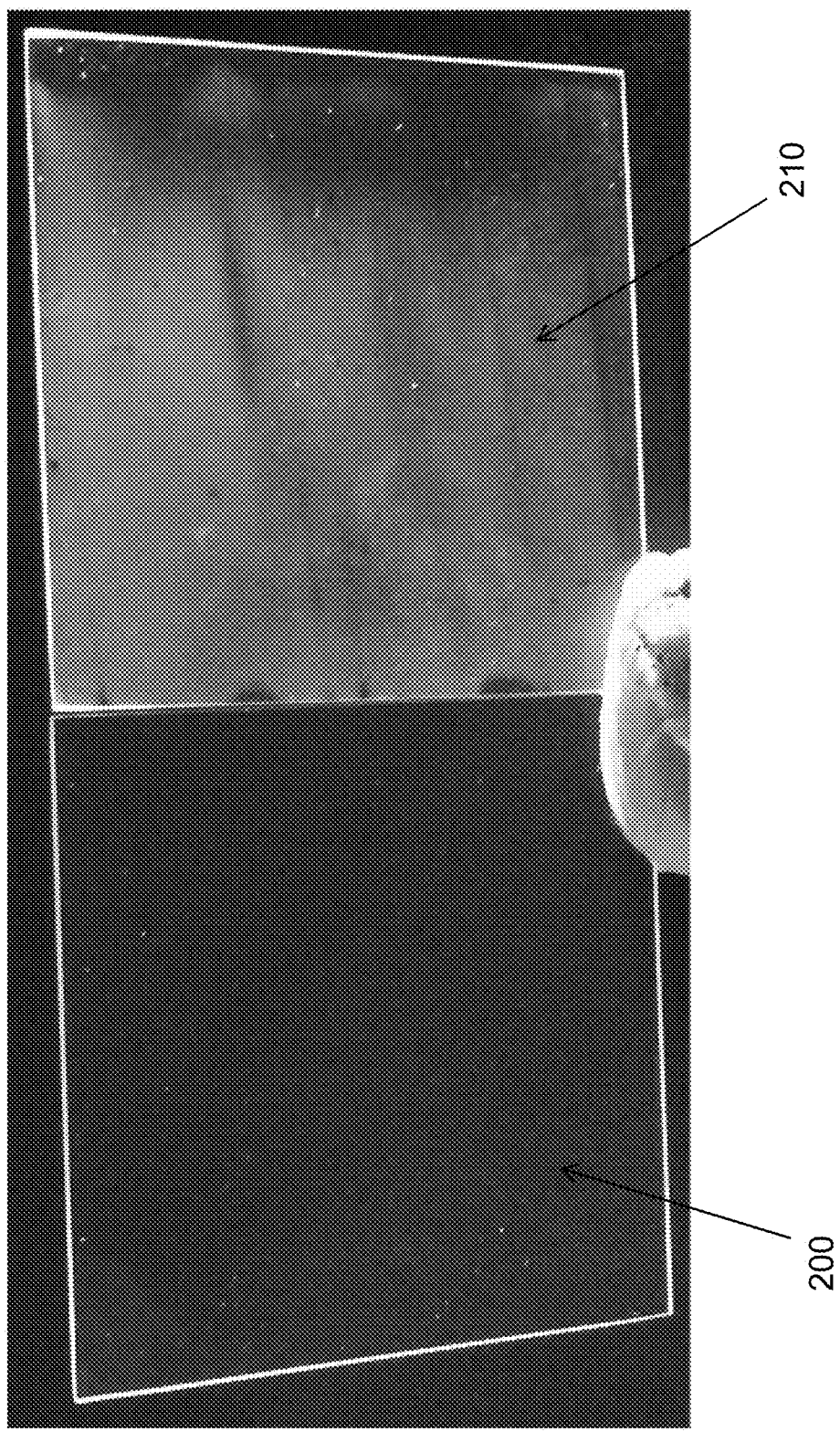
FIG. 2 is a photograph of a glass-based article ion exchanged in a bath containing a nitrite salt and a glass-based article ion exchanged in a nitrite-free bath.
Figure 3:
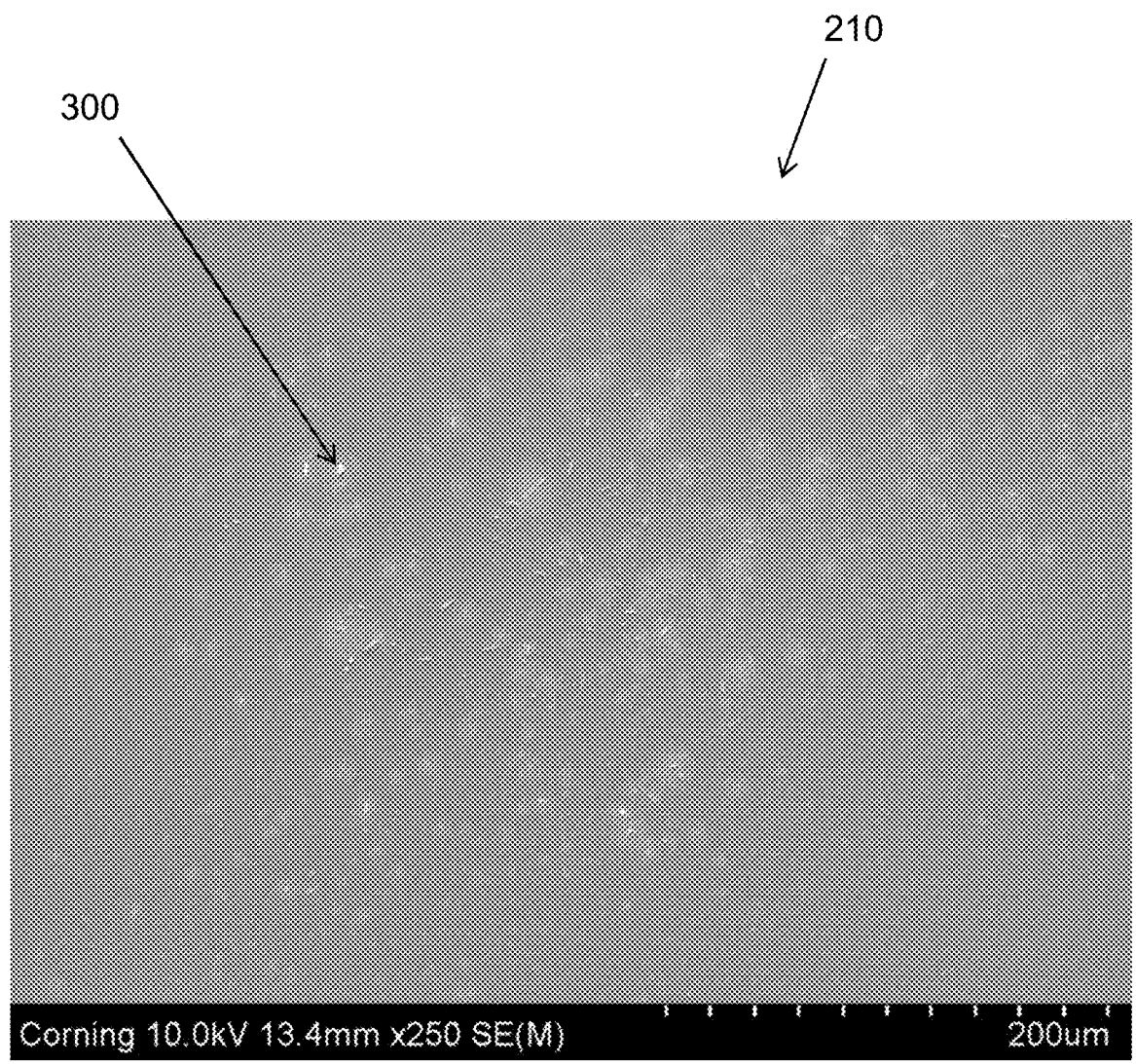
FIG. 3 is a scanning electron microscope (SEM) image of a glass-based article after ion exchange in an unaged bath including surface deposits and clean regions.

As a non-limiting exemplary embodiment, 0.5 wt % of $NaNO_2$ was added to a $NaNO_3$ molten salt bath. A petalite crystalline phase containing glass ceramic substrate was ion exchanged in the nitrite containing bath for 4 hours at a temperature of 470° C. As a comparative example, a petalite crystalline phase containing glass ceramic substrate was ion exchanged in a nitrite-free $NaNO_3$ bath for 4 hours at a temperature of 470° C. The nitrite-free bath was not aged prior to the ion exchange. As shown in FIG. 2, the glass ceramic article produced with the nitrite containing bath 200 was haze-free, while the comparative glass ceramic article ion exchanged in the nitrite-free bath 210 exhibited a hazy surface. The surface of the glass ceramic article ion exchanged in the nitrite-free bath 210 was examined with a scanning electron microscope (SEM), and inhomogeneous deposits 300 were detected as shown in FIG. 3.

Figure 4:
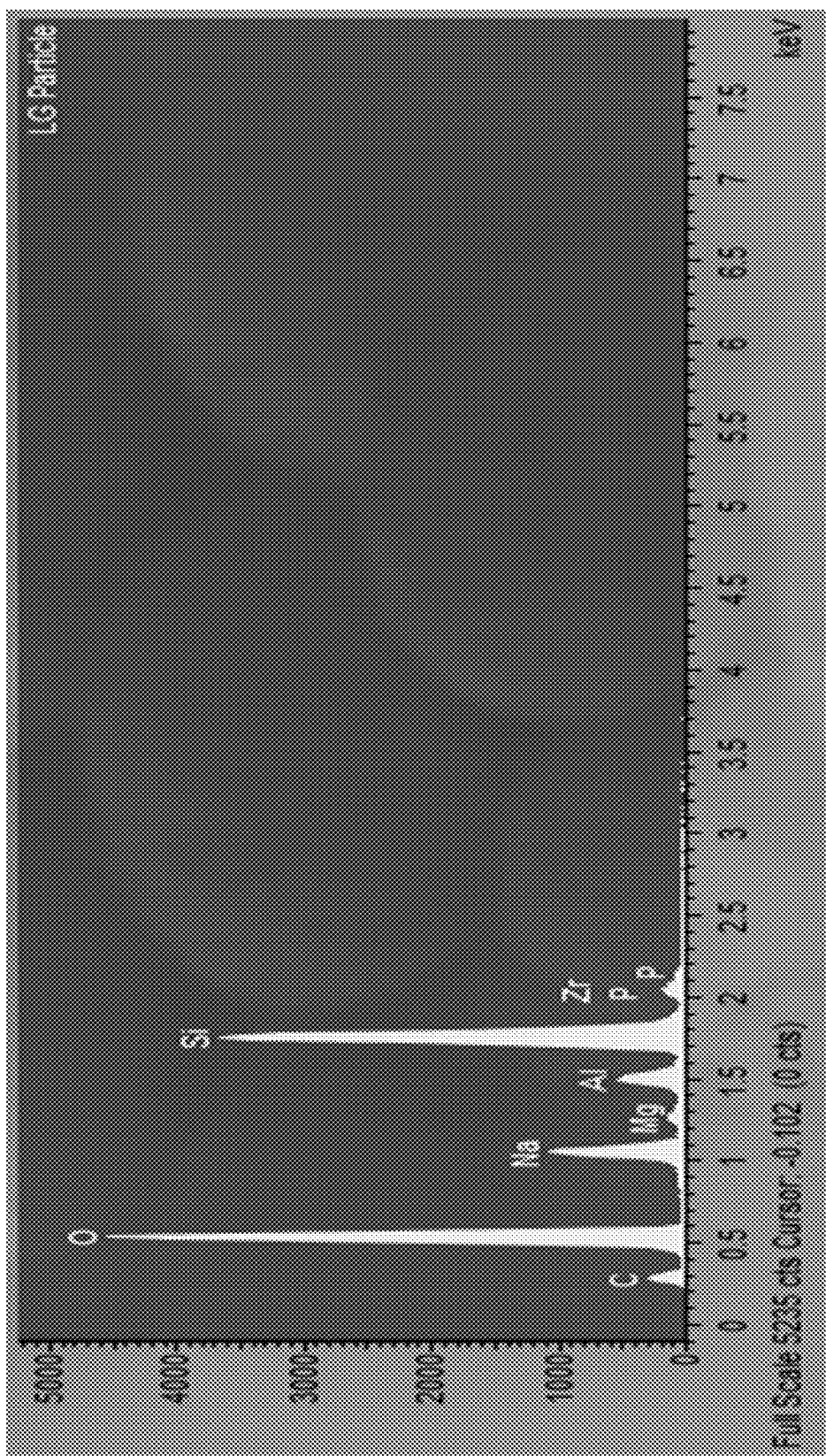
FIG. 4 is an energy dispersive spectroscopy (EDS) analysis of a deposit of FIG. 3.
Figure 5:
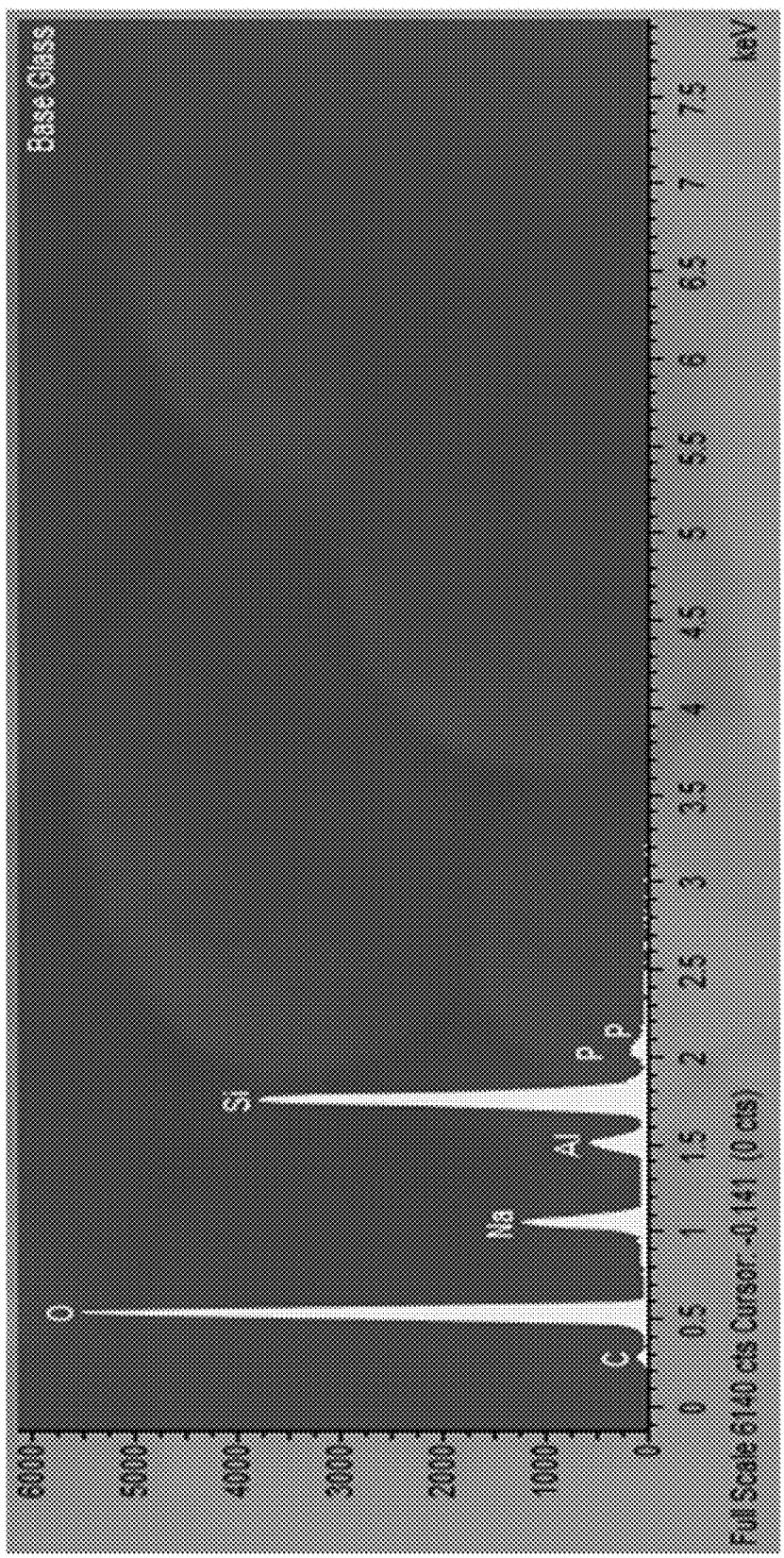
FIG. 5 is an EDS analysis of a clean region of FIG. 3.

A portion of the surface of the glass ceramic article ion exchanged in the nitrite-free bath 210 containing a deposit 300 was subjected to an energy dispersive spectroscopy (EDS) analysis. As shown in FIG. 4, the EDS analysis indicates that the deposit contains magnesium. By contrast, an area of the surface that did not contain a deposit did not contain magnesium, as shown in FIG. 5. These results support the conclusion that the deposits and resulting haze are due at least in part to impurities, such as magnesium and calcium, present in the molten salt bath.

Figure 6:
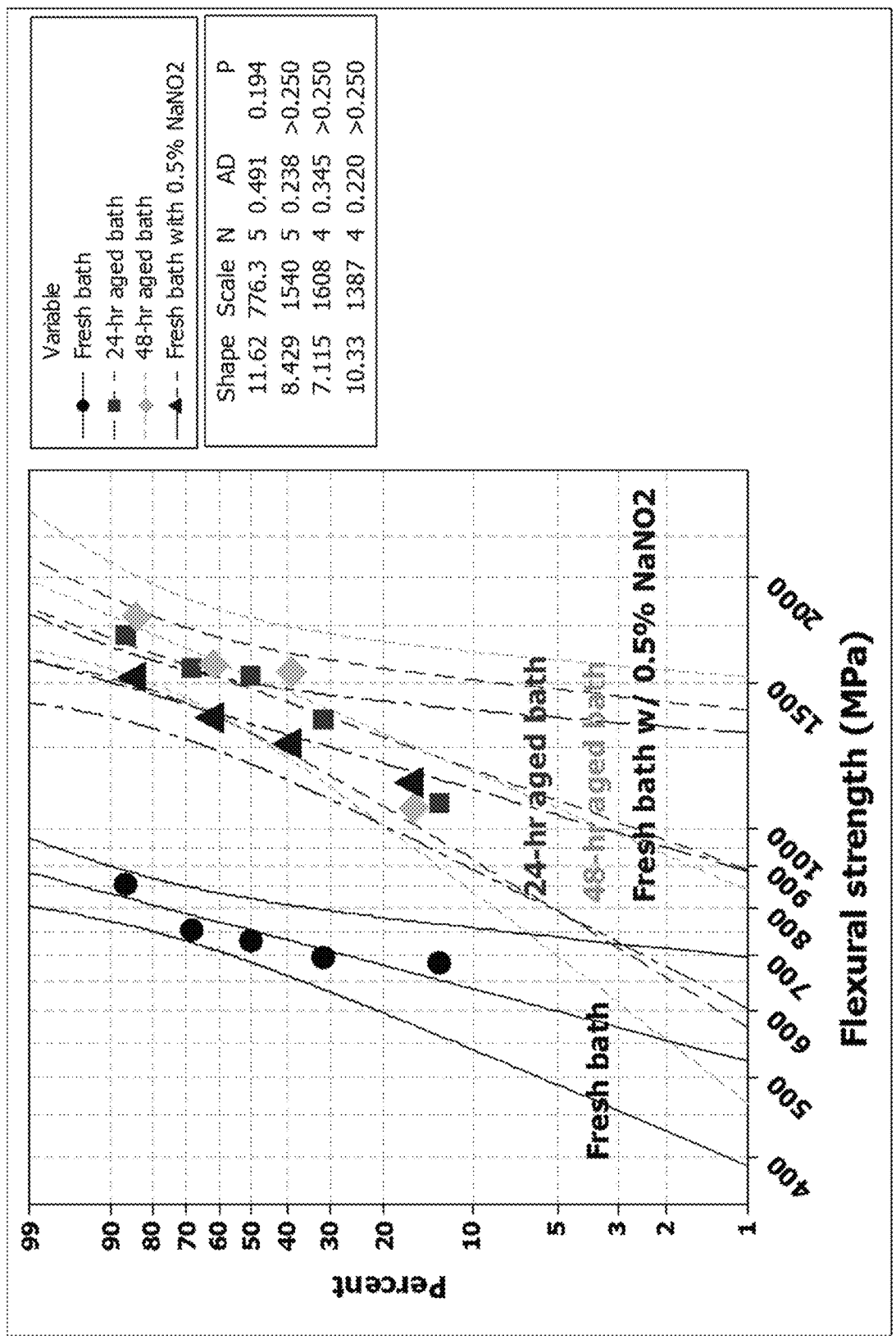
FIG. 6 is a plot demonstrating the effect of ion exchange bath conditions on flexural strength of ion exchanged glass-articles.

As additional exemplary embodiments, petalite containing glass ceramic substrates were ion exchanged in sodium nitrate baths that were aged at a temperature of 470° C. for 24 hours and 48 hours, under the same ion exchange conditions as the previous example. The flexural strength of the glass ceramics ion exchanged in the unaged (nitrite-free) bath, 0.5 wt % $NaNO_2$ added bath, 24 hour aged bath, and 48 hour aged bath was then measured with ring on ring testing, as described below. As shown in FIG. 6, the unaged (nitrite-free) bath produced a glass ceramic article with a significantly lower flexural strength than the glass ceramic articles produced with the nitrite containing baths of the type described herein. FIG. 6 is a Weibull plot, where each data point represents the percentage of the samples that fail at a given flexural stress. This data further indicates that the presence of haze is correlated to a reduced flexural strength in ion exchanged articles.

According to one or more embodiments, the increase or decrease in strength on one side of a glass-based substrate can be determined using ring on ring (RoR) testing. The strength of a material is defined as the stress at which fracture occurs. The RoR test is a surface strength measurement for testing flat glass specimens, and ASTM C1499-09 (2013), entitled "Standard Test Method for Monotonic Equibiaxial Flexural Strength of Advanced Ceramics at Ambient Temperature," serves as the basis for the RoR test methodology described herein. The contents of ASTM C1499-09 are incorporated herein by reference in their entirety.

Figure 7:
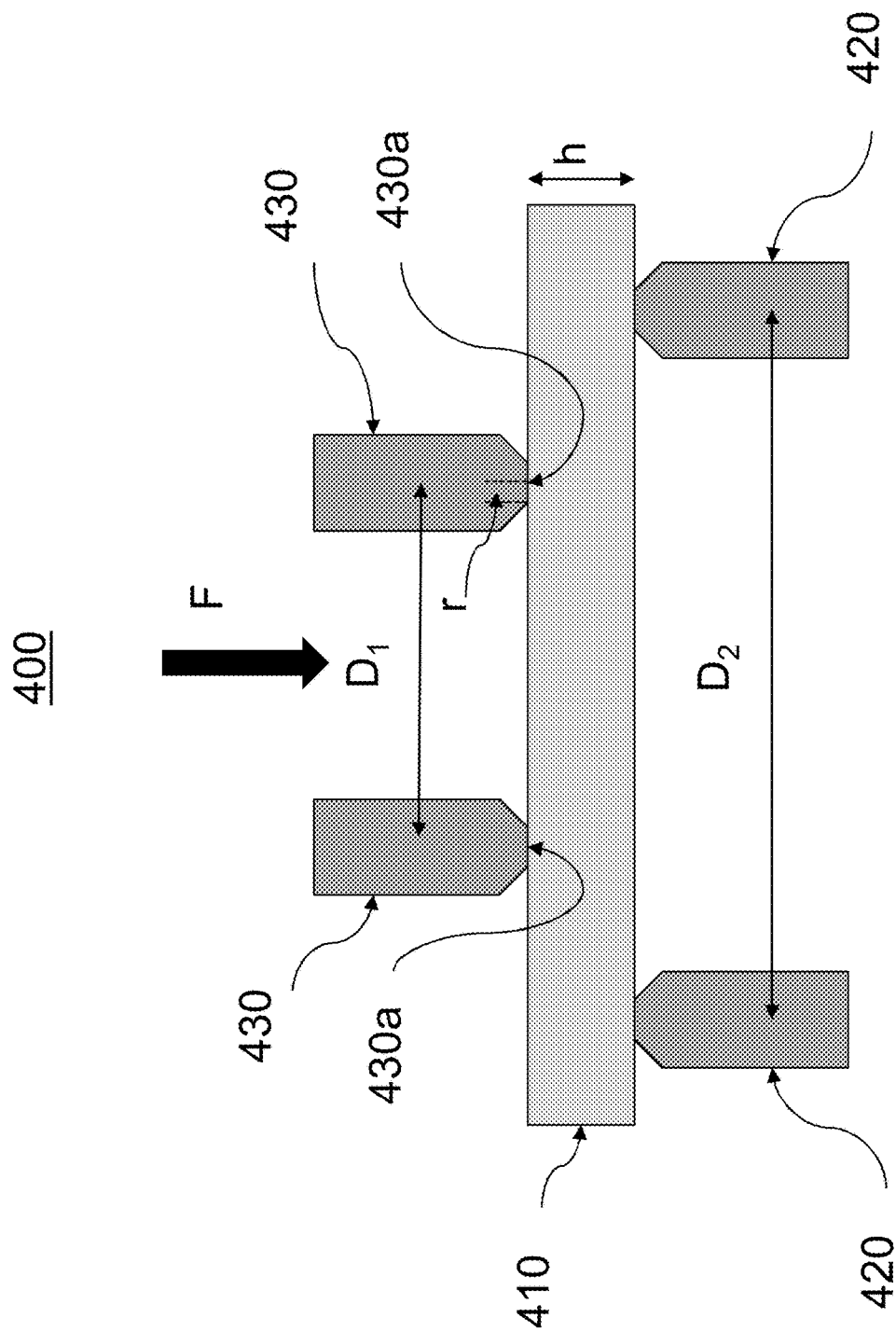
FIG. 7 is a schematic representation of a ring-on-ring (RoR) test apparatus.

For the RoR test, a glass-based article as shown in FIG. 7 is placed between two concentric rings of differing size to determine equibiaxial flexural strength (i.e., the maximum stress that a material is capable of sustaining when subjected to flexure between two concentric rings). In the RoR configuration 400, the glass-based article 410 is supported by a support ring 420 having a diameter D2. A force F is applied by a load cell (not shown) to the surface of the glass-based article by a loading ring 430 having a diameter D1.

The ratio of diameters of the loading ring and support ring D1/D2 may be in a range from 0.2 to 0.5. In some embodiments, D1/D2 is 0.5. Loading and support rings 430, 420 should be aligned concentrically to within 0.5% of support ring diameter D2. The load cell used for testing should be accurate to within ±1% at any load within a selected range. Testing is carried out at a temperature of 23±2° C. and a relative humidity of 40±10%.

For fixture design, the radius r of the protruding surface of the loading ring 430 is in a range of h/2≤r≤3h/2, where h is the thickness of glass-based article 410. Loading and support rings 430, 420 are made of hardened steel with hardness HRc>40. RoR fixtures are commercially available.

The intended failure mechanism for the RoR test is to observe fracture of the glass-based article 410 originating from the surface 430a within the loading ring 430. Failures that occur outside of this region—i.e., between the loading ring 430 and support ring 420—are omitted from data analysis. Due to the thinness and high strength of the glass-based article 410, however, large deflections that exceed ½ of the specimen thickness h are sometimes observed. It is therefore not uncommon to observe a high percentage of failures originating from underneath the loading ring 430. Stress cannot be accurately calculated without knowledge of stress development both inside and under the ring (collected via strain gauge analysis) and the origin of failure in each specimen. RoR testing therefore focuses on peak load at failure as the measured response.

The strength of glass-based article depends on the presence of surface flaws. However, the likelihood of a flaw of a given size being present cannot be precisely predicted, as the strength of glass is statistical in nature. A probability distribution can therefore be used as a statistical representation of the data obtained.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

What is claimed is:

1. A method, comprising:
   immersing a glass-based substrate in a molten salt bath to produce a glass-based article, wherein the glass-based substrate is a glass ceramic substrate that comprises a crystalline phase and a residual glass phase,
   wherein prior to the immersion of any glass-based substrate in the molten salt bath, the molten salt bath comprises:
   greater than 1 ppm of at least one of Mg and Ca;
   a nitrate salt, and
   a nitrite salt in an amount of greater than or equal to 0.01 wt % to less than or equal to 1.0 wt %, wherein the nitrite salt comprises $NaNO_2$.

2. The method of claim 1, wherein the nitrite salt further comprises at least one of $LiNO_2$, $KNO_2$, $RbNO_2$, and $AgNO_2$.

3. The method of claim 1, wherein the nitrate salt comprises at least one of $NaNO_3$, $LiNO_3$, $KNO_3$, $RbNO_3$, and $AgNO_3$.

4. The method of claim 1, further comprising adding the nitrite salt to the molten salt bath prior to immersing the glass-based substrate.

5. The method of claim 4, further comprising aging the molten salt bath at a temperature of 300° C. or greater for a time of 6 hours or more before immersing the glass-based substrate.

6. The method of claim 1, wherein the molten salt bath contains the nitrite salt in an amount of 0.1 wt % or more.

7. The method of claim 1, wherein at least 99% of a surface of the glass-based article is free of haze.

8. The method of claim 1, wherein at least 99% of a surface of the glass-based article is substantially free of magnesium and calcium containing deposits.

9. The method of claim 1, wherein the glass-based substrate comprises at least one of $Li_2O$, $Na_2O$, $K_2O$, and $Rb_2O$.

10. The method of claim 1, wherein the glass-based article has a flexural strength of 500 MPa or more.

11. The method of claim 1, wherein the glass-based substrate comprises $Li_2O$.

12. The method of claim 1, wherein the glass-based substrate comprises petalite.

13. The method of claim 1, wherein the nitrate salt comprises $NaNO_3$.

14. The method of claim 1, wherein the nitrate salt is substantially free of $KNO_3$.

* * * * *

UNITED STATES PATENT AND TRADEMARK OFFICE
CERTIFICATE OF CORRECTION

PATENT NO. : 11,358,898 B2
APPLICATION NO. : 16/155302
DATED : June 14, 2022
INVENTOR(S) : Qiang Fu et al.

It is certified that error appears in the above-identified patent and that said Letters Patent is hereby corrected as shown below:

On the Title Page

On the page 2, in Column 2, under Item (56) "Other Publications", Line 11, delete "Chern." and insert -- Chem. --.

Signed and Sealed this
First Day of October, 2024

Katherine Kelly Vidal
*Director of the United States Patent and Trademark Office*